Figure 1:
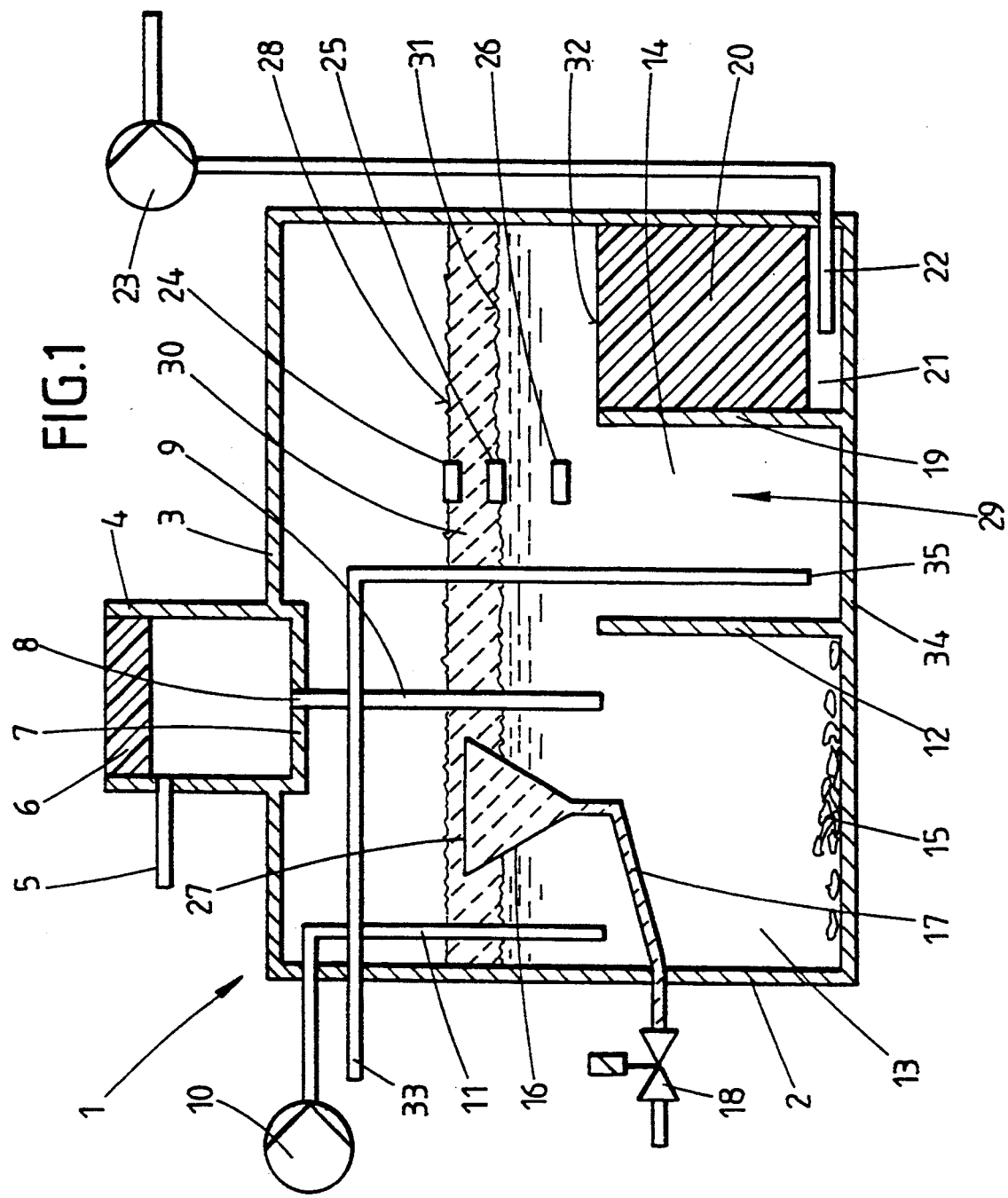

United States Patent [19]
Koch

[11] Patent Number: 5,378,353
[45] Date of Patent: Jan. 3, 1995

[54] ARRANGEMENT FOR THE SEPARATION OF FLOATING OIL FROM OIL/WATER MIXTURES

[76] Inventor: Berthold Koch, Pützstrasse 4, D-4040, Neuss 1, Germany

[21] Appl. No.: 2,686

[22] Filed: Jan. 8, 1993

Related U.S. Application Data

[63] Continuation of Ser. No. 855,304, Mar. 23, 1992, abandoned.

[30] Foreign Application Priority Data

Apr. 3, 1991 [DE] Germany .............................. 4110726

[51] Int. Cl.⁶ .............................................. B01D 17/12
[52] U.S. Cl. ...................................... 210/86; 210/104; 210/109; 210/134; 210/DIG. 5
[58] Field of Search ................ 210/86, 104, 121, 123, 210/258, 259, 295, 513, 521, 522, 533, 799, 800, 804, DIG. 5, 109, 134, 744, 416.1

[56] References Cited

U.S. PATENT DOCUMENTS

| | | | |
|---|---|---|---|
| 3,396,846 | 8/1968 | Hamilton | 210/744 |
| 3,710,949 | 1/1973 | Murkes | 210/522 |
| 3,852,193 | 12/1974 | Jakuber et al. | 210/799 |
| 3,957,641 | 5/1976 | Jakubek et al. | 210/DIG. 5 |
| 3,965,004 | 6/1976 | Garber | 210/799 |
| 4,011,158 | 3/1977 | Cook | 210/799 |
| 4,426,293 | 1/1984 | Mason et al. | 210/104 |
| 4,436,630 | 3/1984 | Anderson | 210/799 |
| 4,802,978 | 2/1989 | Schmit et al. | 210/104 |
| 4,960,513 | 10/1990 | Young | 210/104 |
| 5,066,407 | 11/1991 | Furlow | 210/521 |

*Primary Examiner*—Joseph W. Drodge
*Attorney, Agent, or Firm*—Pearne, Gordon, McCoy & Granger

[57] ABSTRACT

An arrangement is disclosed for the separation of floating oil from oil/water mixtures, in which the arrangement comprises a tank which contains the mixture, at least one inlet for the mixture and separate outlets for the floating oil and the remaining liquid mixture. In addition, three sensors are provided which are arranged on the tank so as to be vertically displaced relative to each other. The sensors which are arranged uppermost and in the middle control the discharge means for the floating oil, while the sensors arranged in the middle and lowermost are designed and provided to control the discharge means for the liquid mixture to an emulsion separator.

8 Claims, 2 Drawing Sheets

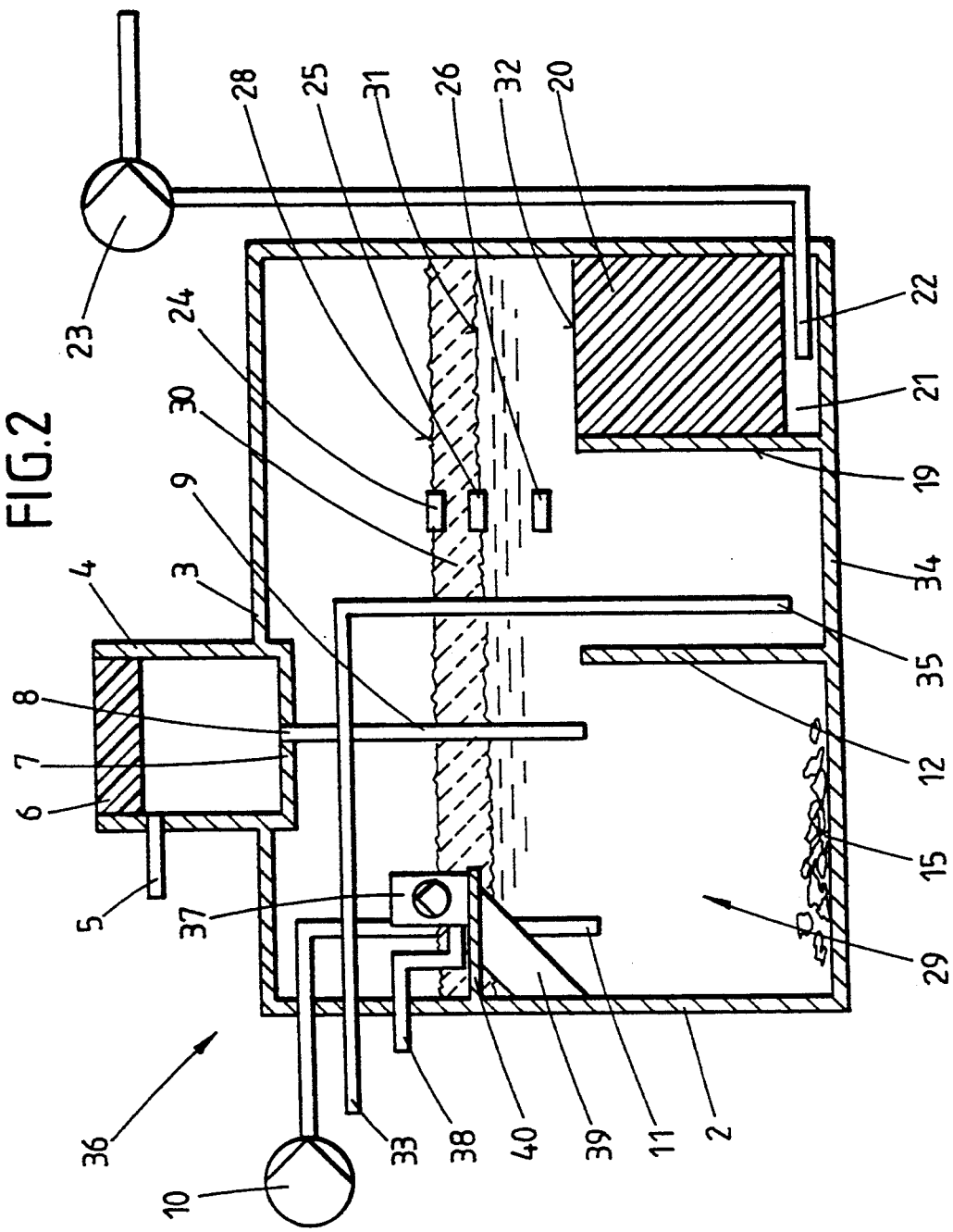

ARRANGEMENT FOR THE SEPARATION OF FLOATING OIL FROM OIL/WATER MIXTURES

This is a continuation of application Ser. No. 07/855,304, filed Mar. 23, 1992 now abandoned.

DESCRIPTION

The invention relates to an arrangement for the separation of floating oil from oil/water mixtures, which arrangement comprises a tank which contains the mixture and has an inlet for the mixture and separate outlets for the floating oil and for the remaining liquid mixture.

Oil/water mixtures such as emulsions contain a relatively large portion of freely separable oil which floats on to the surface when the mixture is kept static or resting. In the case of condensate separated from compressed air systems, compressed gas systems or superheated steam systems, a quantity of up to 98% of the oil contained in the condensate can be freely separated off, after floating up. In other oil/water systems, although that portion of the oil which is emulsified in the water and, thus, not freely separable, is greater, the oil component can, to a large extent, however, also float in the case of such mixtures.

It is desirable that the oil of an oil/water mixture which floats on the bulk liquid be separated from the remainder of the liquid before said liquid, which still contains oil in suspension or emulsified oil, is subjected to a separation of the emulsion.

Object of the invention is to make it possible to separate, effectively, the oil floating on a bulk liquid from said bulk liquid, in a simple manner and also when the level of the bulk liquid fluctuates, in a fully automatic operation.

According to the invention, this object is met by means of an arrangement of the kind mentioned at the outset and having the features set out in the distinguishing clause of patent claim 1. Advantageous developments of the invention are set out in the subordinate claims.

Although, in oil/water mixtures or similar liquid mixtures, the floating oil is not completely free of water inclusions and although oil components are still contained in emulsion in the body of water, it may be said of a preliminary separation and it may be assumed that the floating free oil is essentially pure and is clearly separated from the water or from the other liquid which is heavier than oil.

In the arrangement according to the invention, at least three sensors are arranged vertically above each other, which sensors control the separate discharge of floating and, therefore, separated, oil and of the remaining liquid mixture. The uppermost sensor detects the rising, beyond a specific level, of the liquid disposed in the tank, said sensor not distinguishing between oil and any other liquid, such as water. A second sensor, arranged lower down, does not respond to oil disposed within its sphere but, instead, it responds only to other liquids and, in particular, water, such that it is activated only when there is no more separated oil in its sphere, but when there is, for example, water. A third sensor, arranged even lower down, responds only to water or similar liquid but not, however, to oil, emitting control signals only when the height of the water has dropped below its level.

In this manner, the oil which has been separated from the liquid mixture by floating can be removed completely automatically and separately from the remaining liquid mixture which may still contain oil in emulsion, whereas the oil emulsion is fed to an emulsion separating unit.

Two exemplified embodiments of the arrangement according to the invention are diagrammatically illustrated in the drawing, in each case in a vertical section, the Figures showing FIG. 1 a first embodiment of the arrangement, and
FIG. 2 a second embodiment of the arrangement.

The arrangement (1) shown in FIG. 1 for the separation of floating oil from oil/water mixtures comprises a basin-like housing (2) which is closed by a detachable plate-like lid (3).

The arrangement (1) is provided with two inlets for an oil/water mixture, which inlets can be used jointly or separately and also need not both be provided.

In more detail, let into the lid (3) is a pot-like head (4) into which an inlet pipe (5) opens for condensate under pressure which has, for example, been extracted from a pressure system, and which inlet pipe contains a filter (6) at the top end, through which air, which is carried together with the condensate which is fed in through the inlet pipe (5), can escape. A discharge opening (8), which opens into a downpipe (9) which extends into the housing (2), is provided in the bottom (7) of the head (4) protruding into the housing (2). Any liquid mixture which is fed through the inlet pipe (5) runs, unpressurized, through said downpipe (9) into the housing (2) and, so to say, refills said housing.

A feed pump (10) which feeds into an outlet pipe (11), which is directed into the housing and opens into said housing, is provided as a further and, likewise, optionally usable inlet.

A vertically upright separating wall (12), which subdivides the lower region of the housing (2) into two sections (13, 14), is located within the basin-like housing (2).

The downpipe (9) and the outlet pipe (11) open into the section (13) which, in FIG. 1, is arranged on the left-hand side, and on the floor of which pollutants (15) which cannot float can precipitate, said pollutants being removed by suction from time to time, in a manner which is not illustrated.

A funnel (16), through which floating oil can be drained off, is arranged in section (13) of the basin-like housing (2). Said funnel (16) is provided with a discharge pipe (17) which is guided outward out of the housing (2) and comprises, on the outside, a controllable valve (18) which may, for example, be a solenoid valve. Alternatively, it is also possible to provide a controllable feed pump instead of the valve (18).

A chamber (19), which is open in an upward direction and in which is installed a coalescence filter (2), which fills the cross-section of said chamber, is arranged in the other section (14) of the basin-like housing (2). The suction pipe (22) of a pump (23), by means of which liquid can be sucked out of the housing (2) and fed to an emulsion separating unit which is not illustrated, opens into the lower end (21) of the chamber (19) below the coalescence filter.

Three sensors (24, 25, 26), which are, in this instance, not shown in detail, can provide control signals and thus ensure a fully automatic control of the arrangement (1), and are arranged above one another on the housing (2) and, preferably, on the outside of a lateral wall of said housing.

The uppermost sensor (24) is arranged at an elevation slightly higher than the upper edge (27) of the funnel (16) and is designed such that it provides a control signal when the uppermost level (28) of a liquid contained in the housing (2) reaches it. Since the arrangement (1) is provided in order to separate floating oil from water or from a similar liquid, the uppermost liquid level (28) is, generally, the level of an oil film (30) which is present on a liquid charge. Since the sensor (24) is arranged at an elevation higher than the upper edge (27) of the funnel (16), the sensor (24) responds only when the liquid level (28) of the oil film (30) has risen above the upper edge (27) of the funnel (16). The sensor (24) provides a control signal which opens the valve (18), such that the floating oil film (30) can drain off through the funnel (16) and the discharge pipe (17), even if oil is located in the region of the middle sensor (25) and the latter does, therefore, not respond.

When a quantity of oil has drained off, such that the liquid level (28) of the oil film (30) has fallen below the sensor (24), said sensor no longer provides a control signal, such that the valve (18) is closed, thus interrupting the discharge of oil, wherein a time delay may be provided.

Both the middle sensor (25) and the lowermost sensor (26) respond only to water or to a similar liquid, but not to oil. In this regard, the middle sensor (25) is designed such that it provides a control signal when the upper level (31) of the liquid charge (29) which is, in general, water or an oil/water emulsion, reaches it. While the floating oil film (30) is still located within the region of the sensor (25), said sensor does not provide a control signal.

When the middle sensor (25) provides a control signal, the pump (23) is actuated and then sucks liquid through the suction pipe (22) out of the housing (2), the liquid thereby being drawn through the coalescence filter (20) into the bottom end (21) of the chamber (19). When the liquid passes through the coalescence filter, further oil, which is contained in the liquid, is separated off and can rise upward and join up with the floating oil film (30).

The lowermost sensor (26) responds when there is no water or no water emulsion within its region and the liquid level (31) has thus dropped below said region. The lowermost sensor (26) then provides a control signal which disconnects the pump (23). Since the lowermost sensor (26) is clearly disposed above the upper edge (32) of the chamber (19) and, thus, above the upper end of the coalescence filter (20), it is prevented that the pump can suck off the floating oil film (30).

If necessary, i.e. when the control by means of the sensors (24, 25, 26) does not function or does not function satisfactorily, a pipeline (33) is arranged in the housing (2), as an outlet or overflow means, and is directed out of the housing (2) above the uppermost sensor (24), the intake end (35) of said pipeline opening up in the section (14) of the housing (2) in the vicinity of the bottom (34) of said housing.

The embodiment of an arrangement (36), as illustrated in FIG. 2, for the separation of floating oil from oil/water mixtures is, substantially, of the same design as the arrangement (1) illustrated in FIG. 1, such that the following description is restricted merely to the different design for the removal of the oil, and the parts in FIG. 2 which are identical to the parts according to the embodiment according to FIG. 1 are designated by the same reference numbers.

In the arrangement (36) illustrated in FIG. 2, the oil floating in the oil film (30) is sucked off by a pump (37), which is dipped into the oil film, and is carried away via a pressure pipe (38) of said pump. For this reason, a funnel for the collection of the floating oil is not required.

The pump (37) is arranged on a bracket (39), the horizontally extending plate (40) of which bracket is arranged at an elevation lower than the uppermost sensor (24), but with its upper side at an elevation higher than the middle sensor (25). As a result hereof, it is ensured that the pump (37) is dipped into the floating oil film (30) when the level (28) thereof reaches the sensor (24) which emits an appropriate control signal, and when the oil film (30) is also still within the region of the middle sensor (25).

For the rest, the arrangement (36) shown in FIG. 2 functions in the same manner as the arrangement (1) illustrated in FIG. 1, with the result that a fresh description of the operating procedure is not required.

The present invention provides the means for the separation of an oil film from a body of water in a collecting tank, with a fluctuating filling level. In this connection, it is also possible to separate oil, which is floating in the collecting tank, from oil/water mixtures which are provided in different locations, in varying quantities and at different times.

It is, essentially, the two upper sensors (24 and 25) which detect an oil film on the water mixtures, said sensors being capable of differentiating between oil and water. Whereas the sensor (24) is capable of detecting oil, the sensor (25) can detect only water, or an oil/water mixture or an oil/water emulsion with a relatively low concentration of oil. When the sensor (24), which can detect both oil as well as water, or mixtures and emulsions thereof, detects a level or liquid level, while the sensor (25) does not respond, this signifies that a complete layer of oil is located between the two sensors. It is only in this switching state or logical state that oil is drained off via the valve (18) or the pump (37).

The second operating sequence is organized by the sensor (25) and the third sensor (26), i.e. these sensors switch the suction pump (23) on and off, which pump feeds the remaining oil/water mixture, or the oil/water emulsion, on which the oil film is floating, to a further emulsion separating unit, without said oil film.

The sensors (24, 25 and 26) can, expediently, be capacitively functioning sensors.

When, in the afore-going, mention is made of floating oil, this need not necessarily mean pure oil. Indeed, the floating layer of oil will, in practice, contain a greater or lesser proportion of water. The water contains emulsified oil only in relatively small quantities. The arrangement described above can also be used as working vessel for an ultrafiltration installation.

I claim:

1. An arrangement for the separation of floating oil from an oil/water mixture, which arrangement comprises a tank which contains the mixture and has at least one inlet for the mixture and separate outlets for the floating oil and the remaining liquid mixture, said tank having an uppermost, a middle and a lowermost sensor arranged in or on the tank so as to be vertically displaced relative to each other, the uppermost sensor operable upon detecting the presence of an adjacent mixture level for providing a control signal to activate an oil discharge means for discharging floating oil through the oil outlet, the middle sensor operable upon detecting the presence of an adjacent water level for providing a control signal to activate a mixture discharge means for discharging remaining liquid mixture through the mixture outlet, the lowermost sensor operable upon detecting the absence of an adjacent water level for providing a control signal to deactivate said mixture discharge means, whereby the uppermost and middle sensors control the operation of the oil discharge means for the floating oil, and the middle and lowermost sensors control the operation of said mixture discharge means for discharging the remaining liquid mixture, said oil discharge means for the floating oil comprising a downwardly directed funnel having an upper inlet edge which is disposed below the uppermost sensor and above the lowermost sensor.

2. An arrangement according to claim 1, in which the funnel which serves as the oil discharge means for the floating oil opens into a discharge pipe which contains a starter valve controlled by the uppermost sensor or a suction pump which is controlled by the uppermost sensor.

3. An arrangement according to claim 1, in which the mixture discharge means for the remaining liquid mixture comprises a coalescence filter and a suction pump.

4. An arrangement according to claim 1, in which each of the sensors are capacitively functioning sensors.

5. An arrangement for the separation of floating oil from an oil/water mixture, which arrangement comprises a tank which contains the mixture and has at least one inlet for the mixture and separate outlets for the floating oil and the remaining liquid mixture, which has three sensors which are arranged in or on the tank so as to be vertically displaced relative to each other, the sensors arranged as uppermost and in the middle operable for controlling operation of discharge means for the floating oil comprising a suction Dump having a suction side which is vertically arranged between the uppermost and the middle sensors in the tank, and the sensors which are arranged as middle and lowermost operable controlling operation of further discharge means for the remaining liquid mixture to an emulsion separator.

6. An arrangement according to claim 5, in which the further discharge means for the remaining liquid mixture comprises a coalescence filter and a suction pump.

7. An arrangement according to claim 5, in which each of the sensors are capacitively functioning sensors.

8. An arrangement for the separation of floating oil from an oil/water mixture, which arrangement comprises a tank which contains the mixture and has at least one inlet for the mixture and separate outlets for the floating oil and the remaining liquid mixture, said tank having an uppermost, a middle and a lowermost sensor arranged in or on the tank so as to be vertically displaced relative to each other, the uppermost sensor operable upon detecting the presence of an adjacent mixture level for providing a control signal to activate an oil discharge means for discharging floating oil through the oil outlet, the middle sensor operable upon detecting the presence of an adjacent water level for providing a control signal to activate a mixture discharge means for discharging remaining liquid mixture through the mixture outlet, the lowermost sensor operable upon detecting the absence of an adjacent water level for providing a control signal to deactivate said mixture discharge means, whereby the uppermost and middle sensors control the operation of the oil discharge means for the floating oil, and the middle and lowermost sensors control the operation of said mixture discharge means for discharging the remaining liquid mixture, said oil discharge means for the floating oil comprising a suction pump having a suction side which is vertically arranged between the uppermost and the middle sensors in the tank.

* * * * *